Figure 1:
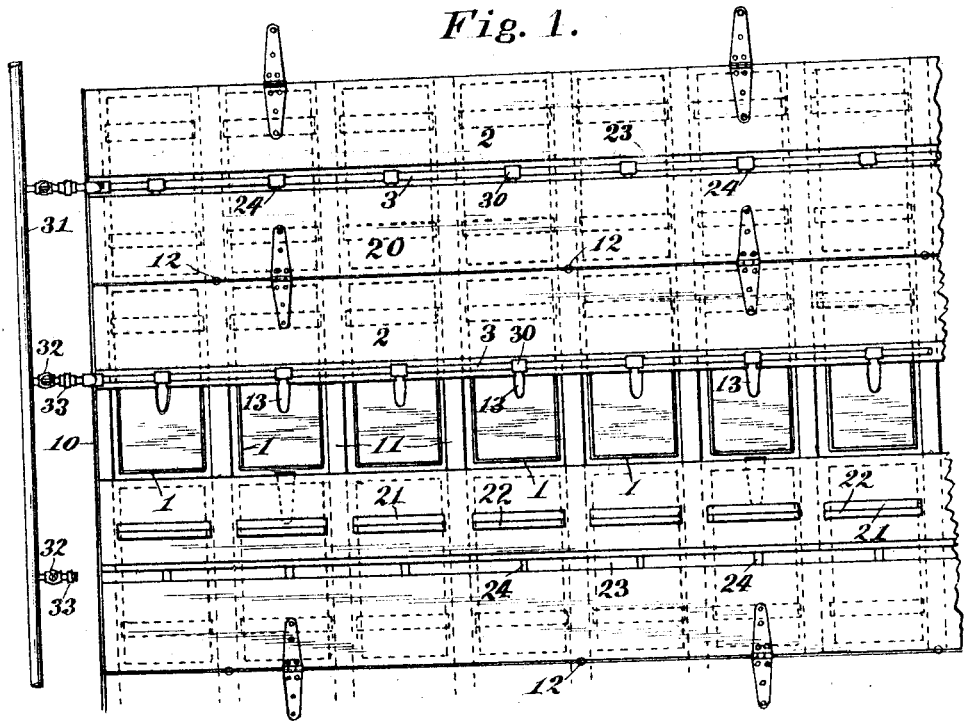

W. McCORMICK.
ICE MAKING APPARATUS.
APPLICATION FILED JULY 16, 1912.

1,077,484.

Patented Nov. 4, 1913.

2 SHEETS—SHEET 1.

WITNESSES.
Frank L. Stubbs
Frank H. Westfeldt

INVENTOR.
William McCormick.
By Henry L. Reynolds
ATTORNEY.

W. McCORMICK.
ICE MAKING APPARATUS.
APPLICATION FILED JULY 18, 1912.
1,077,484.
Patented Nov. 4, 1913.
2 SHEETS—SHEET 2.
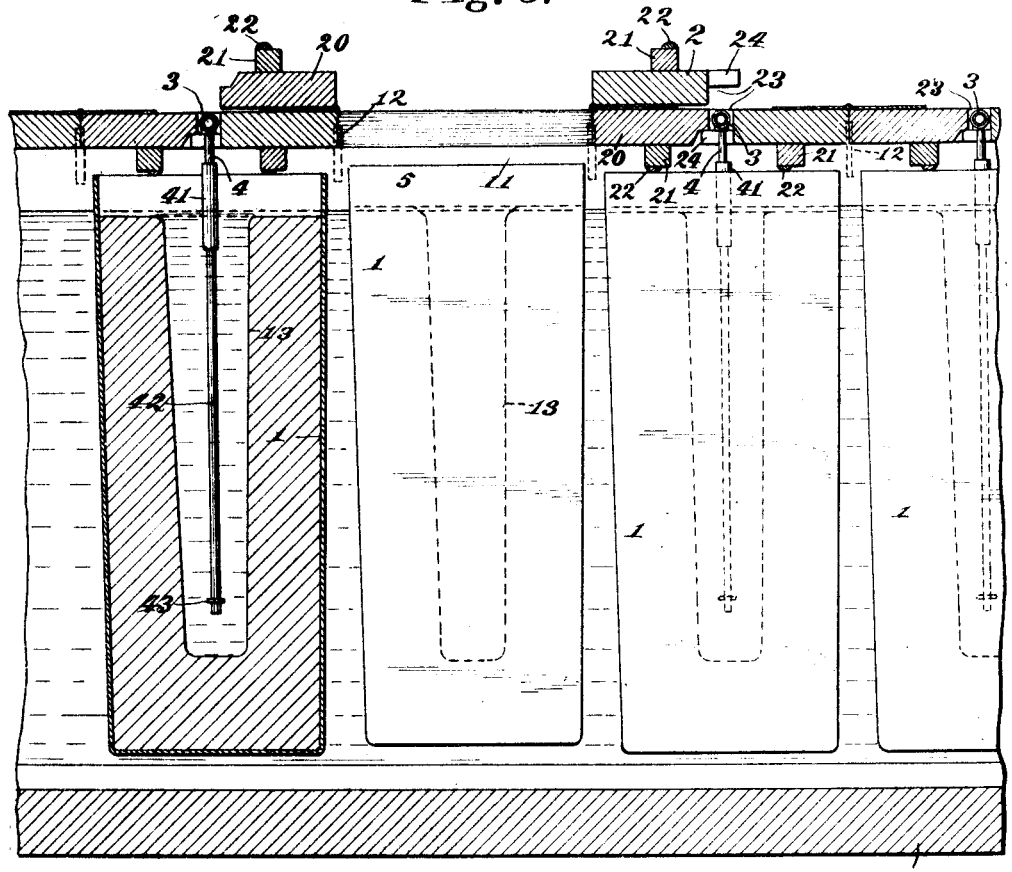
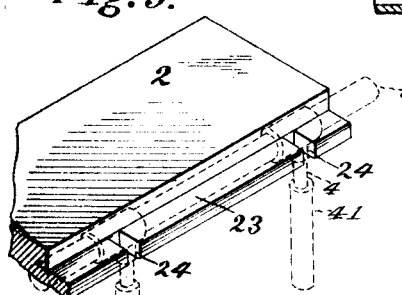
WITNESSES.
Frank L. Stubbs.
Frank H. Wakefield
INVENTOR.
William McCormick.
By Henry L. Reynolds
ATTORNEY.

UNITED STATES PATENT OFFICE.

WILLIAM McCORMICK, OF SEATTLE, WASHINGTON, ASSIGNOR OF ONE-FOURTH TO THOMAS C. WAND AND ONE-FOURTH TO C. F. McDOWELL, BOTH OF SNOHOMISH, WASHINGTON.

ICE-MAKING APPARATUS.

1,077,484.  Specification of Letters Patent.  Patented Nov. 4, 1913.

Application filed July 18, 1912. Serial No. 710,297.

*To all whom it may concern:*

Be it known that I, WILLIAM McCORMICK, a citizen of the United States, and resident of the city of Seattle, in the county of King and State of Washington, have invented certain new and useful Improvements in Ice-Making Apparatus, of which the following is a specification.

My invention relates to apparatus for making ice, and particularly consists of improvements in apparatus for making can ice from raw water, whereby the product is improved in clearness, the core is reduced in size and the simplicity, adaptability, general reliability and freedom from difficulties in handling the device greatly improved upon.

The object of my invention is to improve and simplify such devices, particularly along the lines above indicated.

My invention comprises the parts and combinations of parts which are hereinafter described and particularly pointed out in the claims.

In the drawings accompanying herewith I have shown my invention embodied in the form which is now preferred by me.

Figure 2:
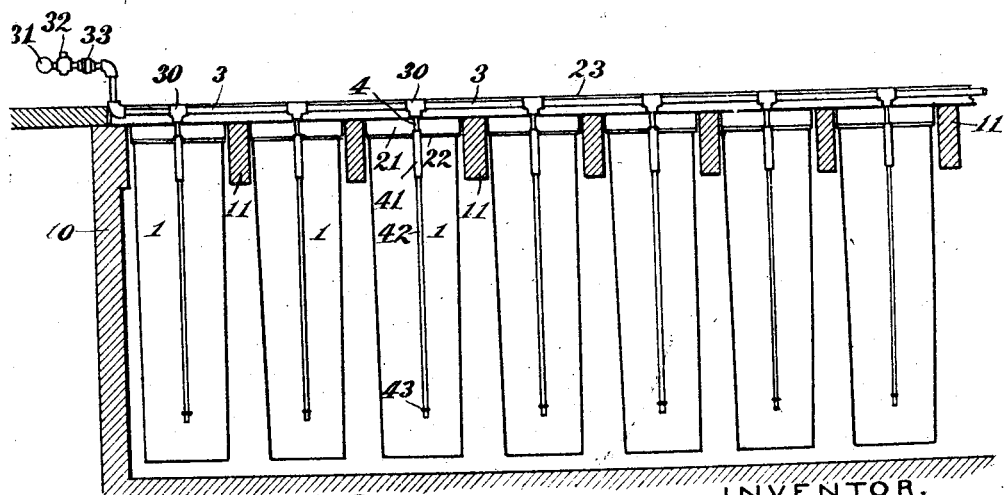

Figure 1 is a plan view of a section of a freezing tank of a can system showing my apparatus in use. Fig. 2 is a sectional elevation of the same. Fig. 3 is a sectional elevation of the same taken from a position at right angles to that used for Fig. 2. Fig. 4 is an enlarged detail showing the construction of the reducer connection between the lateral header and the drop pipe which enters the can. Fig. 5 shows, in perspective, a short section of one of the hinged covers for the tank.

A system which has been proposed and put into use for the making of clear ice from raw water by the can system, involves, as its essential principle, the continuous injection of air into the water in the can while freezing, this acting, by its circulation effect upon the water, to remove the air disengaged by the process of freezing. This process has been demonstrated to be capable of producing clear ice and to be a success, at least as long as the apparatus works satisfactorily, but numerous practical difficulties in the operation of the apparatus have developed, which greatly decrease its practical value. Among these difficulties are the freezing of moisture in the air supply pipes, the formation of a "snow ball" upon the end of the discharge pipe, the necessity of extracting the moisture from the air before using it, and the necessity in many systems, of using a special type of can or tank structure and extra time and labor in handling. With my improved apparatus I employ a freezing tank and cans of the type which has long been standard in the manufacture of can ice from distilled water.

In Figs. 1, 2 and 3 are shown a section of a freezing tank with the cans in place, the structure being, in the main, standard, varying from this only as particularly pointed out.

The tank 10 is designed for containing the freezing brine. It is divided into narrow sections by the joists 11, between which the cans 1 are placed. The type of covers which I prefer for the tank consist of doors 2 and 20, each wide enough to cover half the width of a row of cans of any length found convenient or desirable. These are hinged, preferably to each other, in pairs, so that they may be turned up to expose the row of cans.

One of each set of covers, the side 2, has its outer or swinging edge, rabbeted, as at 23, so that when both covers are down a groove or channel remains extending centrally over the row of cans and of a size to receive an air distributing lateral or secondary header so that it is entirely below the level of the top of the covers.

The reduced outer edge section 23, of this cover, is notched centrally over each can position, through which notch 24, a pipe may be dropped into the can below for the supply of air thereto. The other cover 20, is rabbeted, so as to shut down upon the edge of the other cover 2.

Alongside the freezing tank is installed a header 31, which is supplied with air under pressure from any suitable source of supply. This pressure needs not be great. I have found that pressures of from two to five pounds are satisfactory. With this are connected the distributing laterals, which as here shown, consist of short pipe sections 3 and connecting T's 30. This pipe may be made of a single piece tapped at intervals for the reception of the supplies with which the drop pipes are connected. These laterals are connected with the header 31 in any manner permitting convenient connection and disconnection, as by unions 33 and valves 32. A short hose section may be used for this connection.

The drop pipes which are connected with each T 30, are shown in detail on a larger scale in Fig. 4. A short section of pipe 4, closed at the top, depends from the T, and this is connected by a flexible conductor, as a rubber pipe section 41, with an iron pipe 42, which is of such length as to reach well toward the bottom of the can. The lower end of pipe 42 has a fender 43, composed of some material which is a much poorer conductor of heat than iron, as of rubber.

The pipe 4 which connects with the T, extends upward close to the top side of the T and has a small hole 40 in its side just below its end. Through this the air escapes in small but regular quantities into the drop pipe. By having this hole small so that it acts as a reducer, small variations in resistance head of the water in different cans makes no material difference in the blowing of water into the individual cans. Placing the hole 40 at as great an elevation as possible prevents any small particle of dirt or scale which may be in the header, from clogging the hole. It also utilizes the body of the pipe and the T's composing the lateral as a trap, to collect and keep back any moisture which may condense out of the air used, preventing it from entering the freezing zone beneath the covers.

The cans with their charge of clear water, are of less weight than an equal volume of the brine, so that there is a tendency for the cans to rise, as is shown in the second can in Fig. 3, or that one beneath the covers which are raised. To secure proper immersion of the cans, and also to secure accurate plumbing thereof, I place blocks 21 upon the under sides of the covers, these being of a length to fit snugly between the joists 11. I prefer that these be provided with iron wear plates 22. These are of such thickness that when the covers are turned down, they will engage the top edge of the cans and depress them to the desired level and will also level or plumb them up, so that they stand plumb and consequently, accurately positioned, with the air discharge pipes 42, centrally placed therein.

This apparatus is handled as follows:—
When ice has been removed from cans and cans replaced, they are filled in the usual manner and when a number equal to the number of drop pipes on a lateral or secondary header, 3, are filled, cover 2, containing notches, is closed, lateral or secondary header 3, is placed and connected to header 31, air turned on, and the other cover 20, is closed. When covers are closed the can-depressing and plumbing blocks 21, engage the top edge of cans to depress them all to the same level and to bring them all plumb. The air blows constantly until the water is all frozen except a small quantity as indicated by the central core in Fig. 3, this view showing the core in its greatest extent. In the other direction this core is quite thin. This unfrozen remnant of water contains most of the impurities contained in the original water. This is pumped out and the space refilled with fresh, clear water. The lateral is disconnected at the union and removed from the cans after pumping out the unfrozen water. It is not replaced again, the water of the core freezing without disturbance. This forms a central core of cloudy or non-transparent ice. The quantity of ice contained in the core is reduced to very small limits, usually to 5% of the cake.

The flexible connection of the pipe 42 with the header, which is secured by using the rubber tube section 41, permits ready swinging movement of the pipe 42. Observation has shown that while the air is blowing, this has a slight, constant swinging movement. Its weight is however, enough to retain it close to the central axis of the can. For successful operation it is necessary to have sufficient weight in this pipe to prevent the water currents produced from carrying and holding the pipe over to one side of the can. Where flexible supports have heretofore been used the pipes have been too light and have been carried to one side and become frozen to the cake.

I have shown a fender 43 of rubber as surrounding the lower end of this pipe. This fender prevents actual contact of the pipe with the ice, thus preventing the metal pipe from freezing in. I am thus able, with safety, to greatly reduce the volume of the core before having to withdraw the pipes. A plant so equipped has been operated for months without freezing in a pipe, the percentage of cores being reduced to 5%.

One important characteristic of my invention is placing the air pipes outside the freezing tank, thereby protecting them from the low temperatures and preventing any danger of their freezing up. The moisture which may be contained in the air will be largely trapped in the lateral header 3, because of placing the discharge opening at an elevation above the lower side of the lateral. This moisture is removed from the header by inclining it when removed upon completion of the freezing of the row of cans. The pipe 42 cannot freeze because it is immersed in unfrozen water. The pipe 42 cannot become frozen to the cake because it never comes into contact therewith.

It has been demonstrated by continuous daily operation under commercial conditions, that it is unnecessary to provide any special means for removing moisture from the air. The air may be taken direct from the atmosphere and discharged through the pipes into the freezing water without any intermediate treatment designed to free it of moisture. There occurs, under these conditions, no freezing of moisture at any point in or upon the pipes. The ice made with this apparatus is as clear as the best distilled-water ice and has a smaller core. Instead of having a wedge base of cloudy or white ice, the base is perfectly clear and the core consists of a thin blade extending from a short distance above the lower end to the top.

Another important practical feature is placing the laterals in grooves or channels in the covers, so that the surface of the tank is smooth, permitting trucking over it or working upon it in any manner desired or necessary.

It is but a moment's work to disconnect or connect any lateral. The number of cans supplied from one lateral may be made any reasonable amount. A row of ten cans have been operated from one lateral with complete satisfaction.

The covers 2 and 20 may be held in proper position upon the supporting beams by a few pins 12, which are placed on the line of hinging and enter between the hinged edges of connected covers. The edges of the covers may be grooved to receive these pieces. This permits complete removal of the covers whenever necessary.

It has been demonstrated by continuous practical operation under ordinary working conditions, that the apparatus above described will make can ice from raw water, which is fully equal to and really superior in quality to can ice made by any of the standard apparatus from distilled water, and that it is no more likely to give trouble than the usual distilled-water ice plants. It is also possible to produce as large a quantity with the same labor.

What I desire to patent is:

1. In an apparatus for making clear can-ice from raw water, the combination with the cans, of a metal air-discharge pipe for each can extending substantially from the upper level of the can downward and a flexible suspension therefor permitting free lateral movement of the lower end of the pipe.

2. In an apparatus for making ice by the can system, a pressure air header extending centrally over each row of cans, an air-discharge pipe for each can extending from the header downward into the cans and each composed of a metal pipe extending throughout substantially the distance from the surface of the water downward, and a flexible pipe section connecting said depending pipe with the header and forming a flexible suspension support and air supply therefor.

3. An apparatus for making clear can-ice from raw water comprising an air discharge pipe for each can, a support therefor permitting free lateral movement of its lower end, and a non-metallic fender surrounding the lower end of said pipe.

4. An apparatus for making clear can-ice from raw water comprising an air discharge pipe within each can extending substantially from the surface of the water downward, a hose section for each pipe forming the supporting and air supplying means therefor, and a non-metallic fender surrounding the lower end of each pipe.

5. In an apparatus for making can-ice, a tank cover composed of a pair of hinged sections for each can row, their swinging edge coming together, one section having notches in its swinging edge for the passage of air discharge pipes.

6. In an apparatus for making can-ice, a tank cover composed of a pair of hinged sectional covers for each row of cans, having their freely swinging edges centrally over the row of cans and notched for the passage of air-discharge pipes, and can depressing and leveling members beneath and depressed by said covers when the latter are closed down.

7. In an apparatus for making can-ice, a tank provided with means for locating the cans therein in alined rows and sectional covers for said tank, each section being of a size to cover substantially half of a row of cans, said covers being cut away upon the edges which extend over the centers of the cans, to form a recess for the reception of an air-supplying header.

8. In an apparatus for making can-ice, a tank provided with means for locating cans therein in alined rows, and covers having a pipe recessing channel in their upper surfaces located centrally over the center line of the cans.

9. In an apparatus for making can-ice, a tank provided with means for locating the cans therein in alined rows, and a tank cover composed of hinged sections, each covering half of one row of can positions.

10. In an apparatus for making can-ice, a tank provided with means for locating the cans therein in alined rows, and a cover therefor, composed of sections, each covering one half of one row of can positions, said covers being hinged along the line between said rows of can positions.

11. In an apparatus for making can-ice, a tank provided with means for locating the cans therein in alined rows, a cover for said tank composed of sections, each adapted to cover half of a row of can-positions, said cover sections being hinged along the side edges of the rows of can positions, and having notches at their freely swinging edges for the passage of air discharge pipes.

12. In an apparatus for making can-ice, a tank provided with means for locating the cans in alined rows, and a cover therefor composed of sections, each adapted to cover half of one row of can-positions, said sections being hinged along the line between said rows of can-positions to a section covering the adjacent row.

13. In an apparatus for making can-ice, a tank having cover supports extending thereover and provided with means for locating the cans in alined rows, a cover composed of sections each adapted to cover half of a row of can positions, and means for correctly registering the covers consisting of pins projecting upward from the cover supports along the line between can-positions.

14. In an apparatus for making can-ice, a tank, cover supports extending over the tank and serving to position the cans in alined rows, a cover composed of sections, each covering half of a row of can positions, and having can depressing and leveling cleats adapted to enter between the cover supports, said covers being hinged together in pairs, and cover positioning means carried by the cover supports and adapted to enter between the hinged edges of the covers.

15. In an apparatus for making can-ice, a tank, joists extending over the tank, forming cover supports and positioning the cans, covers hinged together in pairs and each of a width to cover substantially half of one row of can-positions, the freely swinging edges of the covers being shaped to form a rabbet opening upwardly when the covers are closed down and having notches, central over the can-positions communicating with the tank, and cover-positioning projections carried by the joists and entering between the hinged edges of the covers.

16. In an apparatus for supplying air to water while freezing the same, a supply header having a series of discharge connections, each supplied through an opening located above the bottom of the supply channel in the header to thereby provide a moisture trap.

17. In an apparatus for supplying air to water while freezing the same, a header having a series of pressure reducing discharge openings located above the bottom of its channel to thereby form a moisture trap.

18. In an apparatus for making ice by the can system, means for supplying air to the water in the cans while freezing, comprising a lateral header having a series of drop pipes permanently secured thereto and having their supply passage located well above the bottom of the passage in the lateral header, whereby said header may act as a moisture trap, and means for detachably connecting said lateral header with a fixed source of supply.

19. In an apparatus for making ice by the can system, means for supplying air to the water in the cans while freezing, comprising a lateral header adapted to extend over a row of cans and provided with means for detachably securing it to a fixed source of supply of air under pressure, a series of drop pipes fixedly secured thereto and having their ends extending upwardly within and across the opening in said header and having its supply opening in its upper part, whereby said header may act as a moisture trap, and means for supporting said lateral header above the can covers with the drop pipes depending into the cans.

20. In a can-system ice making plant, the combination with covers for the cans having channels in their upper surface extending over each row of cans, of air supply pipes adapted to lie in said channels, said covers also having holes located in said channels, one over each can position, and pipes connecting with the air supply pipes and extending through said holes into the cans.

21. In an apparatus for making ice by the can system, the combination with a tank adapted for the reception of the cans, a cover for the tank divided into sections, each adapted to cover substantially half of a row of cans, one section over each row of cans extending slightly beyond the center line of the row of cans and having said central edge rabbeted to form a channel opening upward and also having said edge notched centrally over each can, with an air supply header adapted to lie in said channel and having drop pipes connected therewith and adapted to pass through said notches into the cans.

22. In an apparatus for making ice by the can system, a tank cover composed of sections, each adapted to cover substantially half of a row of cans, the adjacent covers of adjacent rows being hinged together and the supports for said covers having positioning members entering between their hinged edges.

23. In an apparatus for making ice by the can system, a tank cover divided into separate sections for each row of cans, each section consisting of two parts meeting substantially on the center line of the cans, one of these parts being rabbeted on its central edge to form a channel or groove opening upwardly, and being also notched to form openings communicating, one with each of the cans covered thereby.

24. In an apparatus for making ice by the can system, a tank cover composed of sections, each covering substantially half of a row of cans and hinged along the line between the rows of cans. one section for each row of cans having its swinging edge rabbeted on its upper side and notches cut therein, one over each can, said channel and notches being adapted to receive the air supplying pipes.

25. In an apparatus for making can-ice, sectional tank covers rabbeted to form pipe-receiving channels in their upper sides and having holes in said channels communicating with the tank space and adapted to receive air-discharge pipes.

26. A cover-support for ice-freezing tanks, consisting of beams spaced to conform to one width of the cans used and having cover-locating upward projections, arranged in lines, extending transversely of the beams and spaced to conform to the other width of the cans used.

27. In a can-ice making apparatus a tank, cover supports consisting of beams spaced apart to conform to one width of the cans used, cover-locating upward projections spaced to conform to the other width of the cans used, and sectional covers, located by said projections.

28. An apparatus for making ice by can system comprising a tank, cover-supporting beams dividing the tank into sections, each adapted to receive a row of cans, a cover composed of sections extending transversely of and resting upon said beams and each extending over a series of said beams.

29. An apparatus for making ice by the can system, comprising a tank, cover supporting beams dividing the tank into sections, each adapted to receive a row of cans, a cover composed of loose sections extending transversely of said beams and extending over a series of can-positions in said row and means for locating said cover sections lengthwise of the beams.

Signed by me at Seattle, Washington, this 12th day of July, 1912.

WM. McCORMICK.

Witnesses:
B. THOMPSON,
ALEX. C. MACDONALD.